United States Patent
Xiao et al.

[11] Patent Number: 6,129,957
[45] Date of Patent: Oct. 10, 2000

[54] METHOD OF FORMING A SECOND ANTIFERROMAGNETIC EXCHANGE-COUPLING LAYER FOR MAGNETORESISTIVE (MR) AND GIANT MR (GMR) APPLICATIONS

[75] Inventors: Rongfu Xiao, Fremont; Chyu-Jiuh Torng, Pleasanton; Tai Min, San Jose; Hui-Chuan Wang, Pleasanton; Cherng-Chyi Han, San Jose; Mao-Min Chen, San Jose; Po-Kang Wan, San Jose, all of Calif.

[73] Assignee: Headway Technologies, Inc., Milpitas, Calif.

[21] Appl. No.: 09/415,247

[22] Filed: Oct. 12, 1999

[51] Int. Cl.[7] .............................. B29C 35/08; H01F 1/00
[52] U.S. Cl. .................... 427/548; 427/131; 427/132; 427/599; 428/693; 428/699; 428/702; 428/900
[58] Field of Search ..................... 427/131, 132, 427/548, 599; 428/693, 699, 702, 900

[56] References Cited

U.S. PATENT DOCUMENTS

| | | | |
|---|---|---|---|
| 5,561,896 | 10/1996 | Voegeli et al. ................ | 29/603.08 |
| 5,748,399 | 5/1998 | Gill ................................. | 360/66 |
| 5,772,794 | 6/1998 | Uno et al. ...................... | 148/108 |
| 5,856,897 | 1/1999 | Mauri ............................ | 360/113 |
| 5,859,753 | 1/1999 | Ohtsuka et al. .............. | 360/113 |

*Primary Examiner*—Bernard Pianalto
*Attorney, Agent, or Firm*—George O. Saile; Stephen B. Ackerman; Graham S. Jones, II

[57] ABSTRACT

A method of manufacturing a magnetoresistive head comprises forming a magnetoresistive structure with a magnetoresistive element with a first AFM element. Perform a first annealing step at a high temperature with a high magnetic field. Form the remaining MR structure including second AFM elements. Perform a low magnetic field ($H_{ann}$) annealing step following the fabrication of the second AFM elements. Then perform a no externally applied field ($H_{ann}=0$) annealing step at a high temperature to increase the $H_{ex}$ of the second AFM element to full strength, whereby the stability of the first AFM element is enhanced or increases its $H_{ex}$ if there were a decrease during the low magnetic field annealing step.

34 Claims, 6 Drawing Sheets

METHOD OF FORMING A SECOND ANTIFERROMAGNETIC EXCHANGE-COUPLING LAYER FOR MAGNETORESISTIVE (MR) AND GIANT MR (GMR) APPLICATIONS

BACKGROUND OF THE INVENTION

1. Field of the Invention

This invention relates to magnetoresistive (MR) sensors and more particularly to MR sensor devices and methods of fabrication thereof.

2. Description of Related Art

U.S. Pat. No. 5,561,896 of Voegeli et al. for "Method of Fabricating Magnetoresistive Transducer" discloses a method referred to as a Selective Pulse Interdiffusion (SPI) process during which areas destined to become biasing segments of an MagnetoResistive (MR) head are selectively heated using one or more electrical current pulses of short duration. The transducer is a MR device with an H configuration wherein the cross bar of the H is the active central region of a soft magnetic layer. Short current pulses are passed through the side legs of the H to change the legs of the H into a hard magnetic material by annealing/resetting soft magnetic layers to cause interdiffusion between a soft magnetic layer (e.g. Permalloy) and an interdiffusion layer of Ti, Ta, Cr or possibly another transition or refractory metal.

U.S. Pat. No. 5,748,399 of Gill for "Resettable Symmetric Spin Valve" describes a method of annealing AFM layers using short current pulses passed through conductors to heat antiferromagnetic layers beyond their blocking temperatures.

U.S. Pat. No. 5,772,794 of Uno et al. for "Manufacturing Method of Magnetic Head/Apparatus with Spin Valve Effect Magnetoresistive Head" describes a stack of two thin film layers of soft ferromagnetic material separated a thin film layer of a nonmagnetic material, with one of the first and second thin film layers being pinned by a thin film AFM layer. The stack is annealed after the layers are formed to form a uniaxial anisotropy in the pinned soft magnetic layer.

U.S. Pat. No. 5,859,753 of Ohtsuka et al. for "Spin Valve Magneto-resistive Head With Spun Valves Connected in Series" shows a Spin Valve MR head that sets AFM layers that have different blocking temperatures using only two annealing steps. The head includes two magnetization pinning layers, anti-parallel to each other, including AFM layers one of which is NiMn that has a high blocking temperature and one of which is FeMn that has a low blocking temperature. At col. 10, lines 10–19". . . NiMn having a high blocking temperature is formed as the first antiferromagnetic layer . . . on the first magnetization pinning layer . . . at a temperature of 200° to 300° C. The NiMn is grown in a magnetic field $H_{01}$ applied in the first direction. Thereafter, . . . FeMn is formed as the second antiferromagnetic layer . . . on the second magnetization spinning layer . . . at a temperature of around 160° C. While applying a magnetic field $H_{02}$ in the direction opposite to the first direction, the growth of FeMn is carried out." At Col. 10, lines 37–60 it is pointed out that an alternative process can employ a step of heating to the higher blocking temperature and application of field $H_{01}$ which is followed by a step of heating to the lesser blocking temperature temperature and application of magnetic field $H_{02}$ can be deferred until after formation of the AFM layers.

U.S. Pat. No. 5,856,897 of Mauri for "Self-Biased Dual Spin Valve Sensor" shows a Dual Spin Valve (DSV) MR sensor with a free magnetic layer between two pinned magnetic layers.

SUMMARY OF THE INVENTION

This invention teaches for a DSMR or SVMR, a first annealing step for setting a first AFM, a second annealing step for resetting a second AFM layer without affecting the first AFM element and also a third annealing step with no externally applied field ($H_{ann}=0$) at a high temperature (higher than the second annealing temperature) to repair the decreased first exchange and to enhance the second exchange.

For DSMR and SVMR recording head applications, a second AFM element is needed to pin the second MR layer in a preferred direction (DSMR) or the free (sensing) layer in longitudinal direction (SVMR) if exchange-coupling scheme is employed. This invention introduce a new thermal annealing method to form (or reset) such an AFM element without affecting the first (existing) AFM element made either from the same or different materials (such as MnPt/MnPt, MnPdPt/MnPdPt, NiMn/NiMn, or IrMn/MnPt, IrMn/MnPdPt IrMn/NiMn, . . . )

In accordance with this invention a method is provided for manufacturing a magnetoresistive head. First, form a magnetoresistive structure with a magnetoresistive element with a first AFM element. Subsequently, perform a first annealing step at a high temperature with a high magnetic field. Then, form the remaining MR structure including second AFM elements, and perform a low magnetic field ($H_{ann}$) annealing step following the fabrication of the second AFM elements. Subsequently, perform a no externally applied field ($H_{ann}=0$) annealing step at a high temperature to increase the $H_{ex}$ of the second AFM element to full strength, whereby the stability of the first AFM is enhanced or increases its $H_{ex}$ if there were a decrease during the low magnetic field annealing.

In accordance with another aspect of this invention, a magnetoresistive (MR) structure with a magnetoresistive element is formed with a pinned layer and with a first AFM element.

Preferably, the pinned layer is as follows:
(1) a single, soft FerroMagnetic material selected from the group consisting of NiFe, Co, CoFe, and CoNiFe, or
(2) a composite of soft FerroMagnetic materials selected from the groups consisting of NiFe/CoFe, NiFe/Co, CoFe/NiFe, Co/NiFe, CoNiFe/NiFe, NiFe/CoNiFe, CoNiFe/NiFe, Co/CoNiFe, CoNiFe/Co, CoFe/Co, and Co/CoFe.

Preferably, the first AFM element is composed of a high blocking temperature material.

The first and second AFM elements are composed of as follows:
(1) layers of AFM materials selected from the group of ordered/ordered materials consisting of MnPt/MnPt, NiMn/NiMn, MnPdPt/MnPdPt.
(2) layers of AFM materials selected from the group of ordered/disordered materials consist of MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

For DSMR and SVMR recording head applications, a second AFM element is needed to pin a second MR layer (deposited later in a fabrication process) in a preferred direction (DSMR) or the free (sensing) layer along the longitudinal direction (SVMR) if an exchange-coupling scheme is employed.

The conditions for the formation of the second AFM element above the first AFM element should be chosen so no degradation (decrease of exchange magnetic field $H_{ex}$ or rotation of easy axis) occurs in the first AFM element which was formed previously.

This invention introduces a new thermal annealing method to form (or reset) the second AFM element without affecting the first AFM element whether or the first and second AFM elements are made from either the same material or are made from different materials.

Figure 1A:
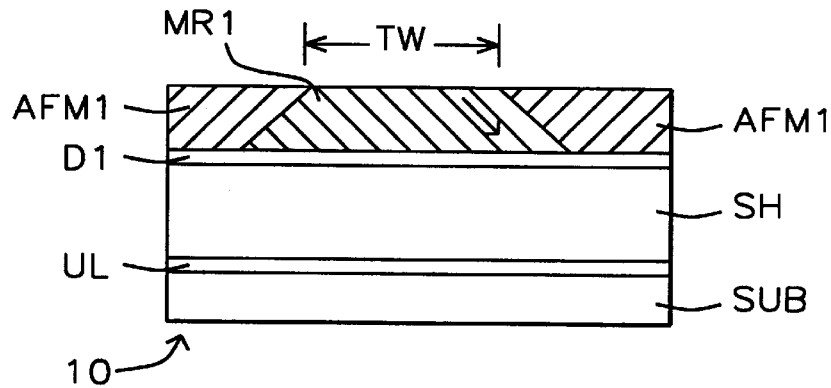
FIG. 1A shows a first stage of manufacture of a DSMR device starting with a first MR stripe.

FIG. 1A shows a first stage of manufacture of a DSMR device 10 starting with a first MR stripe MR1. As usual, the device 10 is formed on a planar substrate SUB upon which a planar undercoat layer UL has been formed covered in turn by a planar magnetic shielding layer SH on which a planar dielectric layer D1 is formed. Then a first MR stripe MR1 is formed on the surface of the dielectric layer D1 in the conventional manner. First MR stripe MR1 is preferably formed of Permalloy (NiFe:Nickel-Iron) or CoFe or CoNiFe with outwardly tapered lateral ends (with a trapezoidal pattern narrower at the top and wider at the bottom, i.e. dielectric layer D1 is widest).

A first set of antiferromagnetic structures AFM1 are formed on the outwardly tapered lateral ends of the first MR stripe MR1. Preferably the first antiferromagnetic structures AFM1 are composed of a high blocking temperature material such as MnPt, NiMn, or MnPdPt. A trackwidth TW is provided between the structures AFM1.

Then the device is subjected to an initial magnetic annealing process within a range of high temperatures from about 250° C. to about 300° C. (with a preferred temperature of about 280° C.) with an external magnetic field from about 1,000 Oe to about 2,000 Oe for about 5 hours.

Figure 1B:
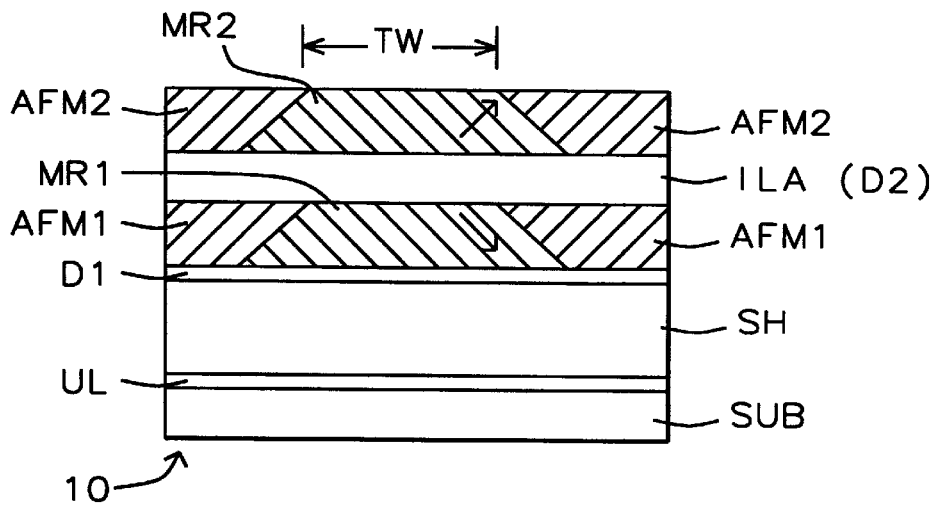
FIG. 1B shows the DSMR device of FIG. 1A after a planar electrically insulating layer was deposited formed of a non-magnetic, dielectric layer covering the top surface of the first MR stripe and the top surfaces of the first set of antiferromagnetic structures which are shown being coplanar on the top with the first MR stripe. On the surface of the insulating layer, a second MR stripe is deposited and a second set of antiferromagnetic structures are formed on the ends of the second MR stripe.

FIG. 1B shows the DSMR device 10 of FIG 1A after a second stage of manufacture. As a first step, a planar, electrical-insulating layer ILA is deposited on the surface of the device 10 of FIG. 1A. Planar, electrical-insulating layer ILA is formed of a non-magnetic, dielectric layer such as alumina (aluminum oxide ($Al_2O_3$)) and/or Aluminum nitride (AlN), silicon oxide ($SiO_2$) covering the top surface of the first MR stripe MR1 and the top surfaces of the first set of antiferromagnetic structures AFM1 which are shown being coplanar on the top with the first MR stripe MR1.

On the planar, upper surface of the planar, electrical-insulating layer ILA, a second MR stripe MR2 is deposited and a second set of antiferromagnetic structures AFM2 are formed at the ends of the second MR stripe MR2. Stripe MR2 also has outwardly tapered lateral ends (narrower at the top and wider at the bottom near dielectric layer ILA.) Preferably the second antiferromagnetic structures AFM2 are composed of a material such as identical materials such as MnPt, NiMn, MnPdPt or disordered materials such as IrMn, FeMn, and NiO.

Then, an intermediate annealing step is employed to safely form (or reset) the second AFM element AFM2 in the presence of the first AFM element AFM1. The key is to select a low annealing magnetic field ($H_{ann}$) and a moderate temperature at which the first AFM pinning layer AFM1 is still stable {i.e., $H_{ann} < H_{ex}$ (T)}.

In the second annealing step, the device is subjected to a second, magnetic annealing process at a low magnetic field $H_{ann}$ with an external magnetic field from about 100 Oe to about 300 Oe (preferably about 250 Oe) at a temperature from about 200° C. to about 260° C. (with a preferred temperature of about 250° C.) for a duration from about 2 hours to about 5 hours.

In a third and final annealing step, after obtaining the exchange magnetic field ($H_{ex}$) for the second AFM element AFM2 (though not as large as the exchange magnetic field ($H_{ex}$) for the first AFM element AFM1), a no externally applied field ($H_{ann}=0$) annealing step at a high temperature is employed to increase the exchange magnetic field ($H_{ex}$) of the second AFM to its fully strength which also further enhances the stability of the first AFM or increases its $H_{ex}$ if there any decrease by the low magnetic field annealing.

In the third annealing step, the device is subjected to a third, annealing process with no external magnetic field ($H_{ann}=0$) of about 270° C. at a preferred high temperature of about 260° C. within a temperature range from about 250° C. to about 300° C., for a duration from about 5 hours to about 10 hours.

Figure 2A:
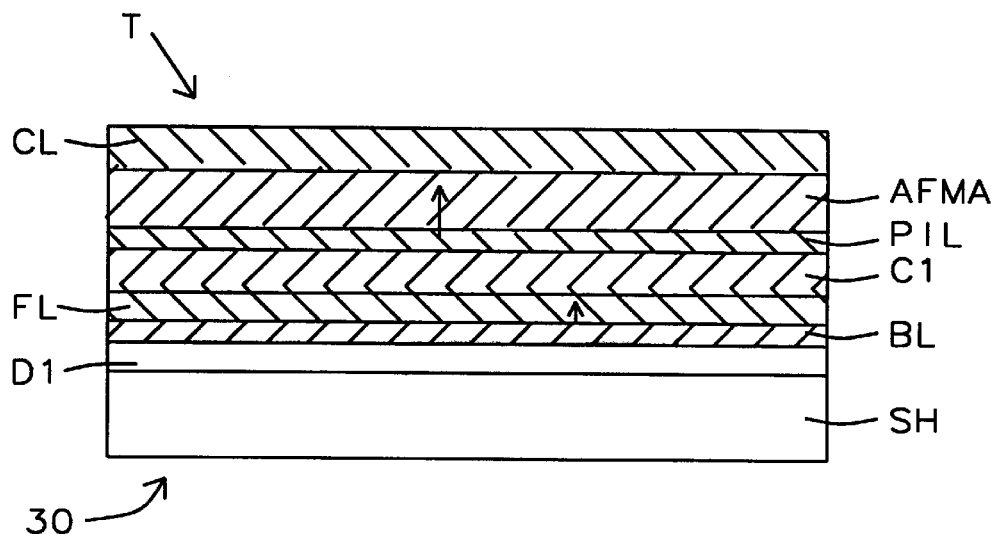
FIG. 2A shows a first stage of manufacture of a top SVMR structure for an SVMR type device comprising a substrate covered with a stack of a base metal layer, a soft Ferro-Magnetic layer, a conductor layer and Ferro-Magnetic composite layers are formed on top of the conductor, a first antiferromagnetic layer, and a metal capping layer. The device has been annealed by a first annealing step.

FIG. 2A shows a first stage of manufacture of a top SVMR structure T for an SVMR type device 30. As usual, the SVMR type device 30 is formed on a planar shield SH upon which a metallic base layer BL (preferably composed of tantalum (Ta), zirconium (Zr), CoZrNb, Permalloy ($Ni_{80}Fe_{20})_{60}Cr_{40}$, etc.) has been formed covered in turn by a soft Ferro-Magnetic, free layer FL composed of a composite of layers of an alloy such as Permalloy ($Ni_{80}Fe_{20}$, Nickel:Iron, 80:20), NiFe/CoFe, or NiFe/Co composite layers on which a planar conductor layer C1 composed of a metal such as copper or gold (Cu or Au) is formed with a planar top surface.

Then a planar, Ferro-Magnetic, composite, pinned layer layer PIL (preferably composed an alloy such as cobalt (Co) or cobalt iron alloy (CoFe), NiFe/CoFe, or NiFe/Co is formed on the planar top surface of copper or gold (Cu or Au) conductor C1. Note that Nickel:iron (NiFe) alloy (e.g. Permalloy) is not good when it is in direct contact with copper because of the metallurgical problem of interdiffusion. Accordingly, it is preferred in the case of use of copper to employ multiple thin layers of Cu/CoFe/AFM, Cu/Co/AFM, Cu/CoFe/NiFe/AFM, or Cu/Co/NiFe/AFM to address the above metallurgical problem.

Then a planar first antiferromagnetic layer AFMA is formed on the planar top surface of Ferro-Magnetic, pinned layer PIL. Preferably the first antiferromagnetic layer AFMA is composed of a high blocking temperature material such as MnPt, MnPdPt, or NiMn.

Next, a capping layer CL formed of a metal such as tantalum is formed on the planar top surface of antiferromagnetic layer AFMA.

Then the device is subjected to an initial magnetic annealing process at a high magnetic field ($H_{ann1}$) preferably about 2,000 Oe at a preferred high temperature of about 280° C. with an external magnetic field in the direction indicated by the arrows in FIG. 2A from about 1,000 Oe to about 2,000 Oe and a temperature from about 250° C. to about 300° C.

Figure 2B:
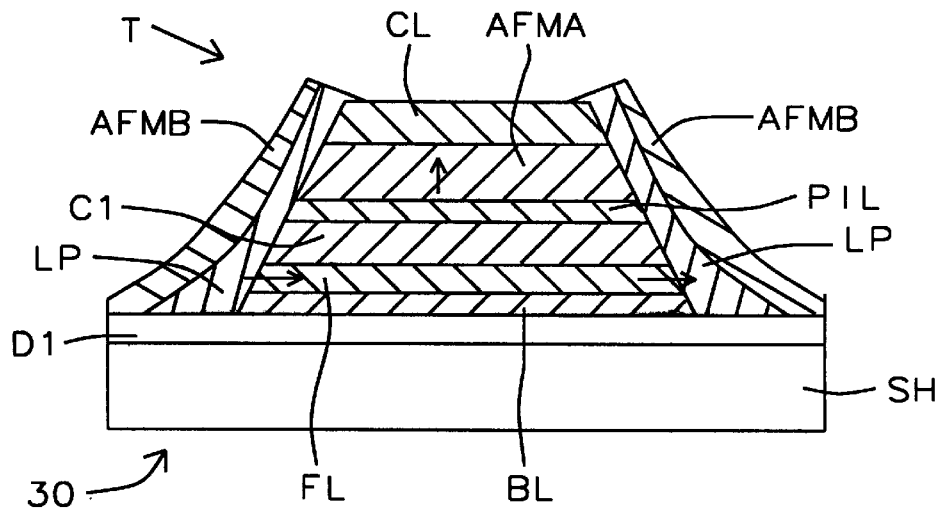
In FIG. 2B the device of FIG. 2A is patterned by conventional etching to have tapered sidewalls resulting in a trapezoidal pattern widest at the bottom and most narrow at the top. A third ferromagnetic, longitudinal pinned layer which covers the sidewalls of the device is covered in turn by a second antiferromagnetic layer.

In the second manufacturing stage, referring to FIG. 2B, structure T of the device 30 of FIG. 2A is patterned by conventional etching to have tapered sidewalls resulting in a trapezoidal pattern in which the free layer FL is widest and the capping layer CL is most narrow.

On those sidewalls a third ferromagnetic, longitudinal pinned layer LP, is formed covering the left and right tapered sidewalls of the device 30 covering the ends of layers BL, FL, C1, PIL, AFMA and CL. Layer LP is preferably composed of a material such as Co, CoFe, or NiFe.

A second antiferromagnetic layer AFMB is stacked on pinned layer LP also covering the tapered sidewalls (over the left and right tapered sidewalls of the device 30) providing structures of the second antiferromagnetic AFMB on the left and the right.

The second antiferromagnetic structures AFMB are composed of a material such as an ordered AFM material such as MnPt, NiMn, MnPdPt or disordered materials such as IrMn, FeMn or NiO.

Figure 2C:
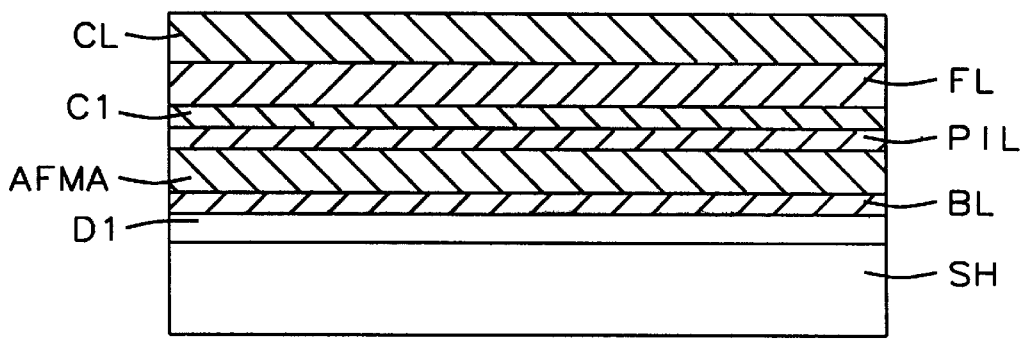
FIG. 2C shows the result of the first stage of manufacture of the bottom SVMR structure of the device of FIG. 2A.

FIG. 2C shows the result of the first stage of manufacture of the bottom SVMR structure B on device 30 in like manner to the top SVMR device T in FIG. 2A.

Figure 2D:
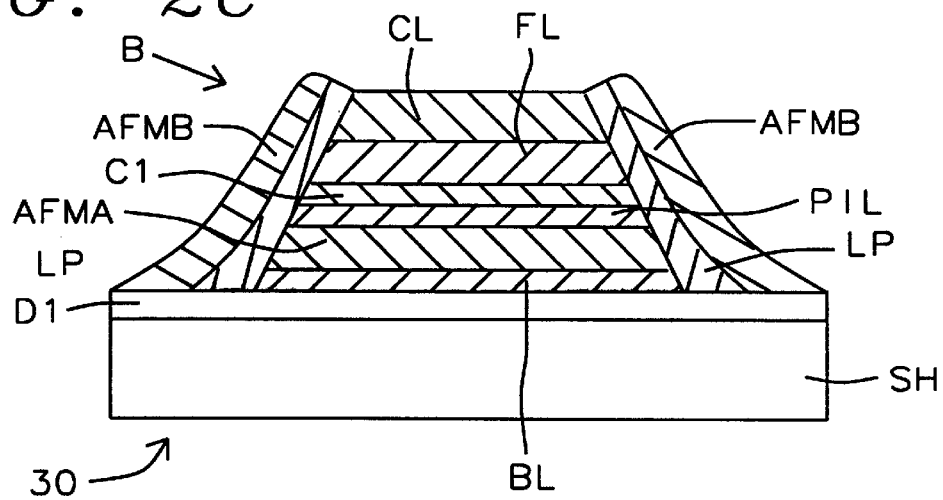
FIG. 2D shows the result of the second stage of manufacturing the bottom SVMR structure of the device of FIG. 2B.

FIG. 2D shows the result of the second stage of manufacturing the bottom SVMR structure B on device 30 in like manner to the top SVMR device T in FIG. 2B.

In the second annealing step, device 30 which now includes top structure T and bottom structure B is subjected to a second, magnetic annealing process at a low second annealing magnetic field ($H_{ann2}$) preferably about 250 Oe at a preferred temperature of about 250° C. with an external annealing magnetic field ($H_{ann2}$) from about 100 Oe to about 300 Oe, at a temperature from about 200° C. to about 260° C.

In a third and final annealing step, after obtaining the exchange magnetic field ($H_{ex}$) for the second AFM element AFMB (though not as large as the $H_{ex}$ for the first AFM element AFMA), a no externally applied field annealing step ($H_{ann3}=0$) at a high temperature is employed to increase the $H_{ex}$ of the second AFM to its fully strength which also further enhances the stability of the first AFM or increases its $H_{ex}$ if there any decrease by the low magnetic field annealing.

In the third annealing step, the device 30 is subjected to a third, annealing process with no external magnetic field ($H_{ann3}=0$) at a preferred high temperature of about 270° C. with a temperature from about 250° C. to about 300° C.

Figure 3:
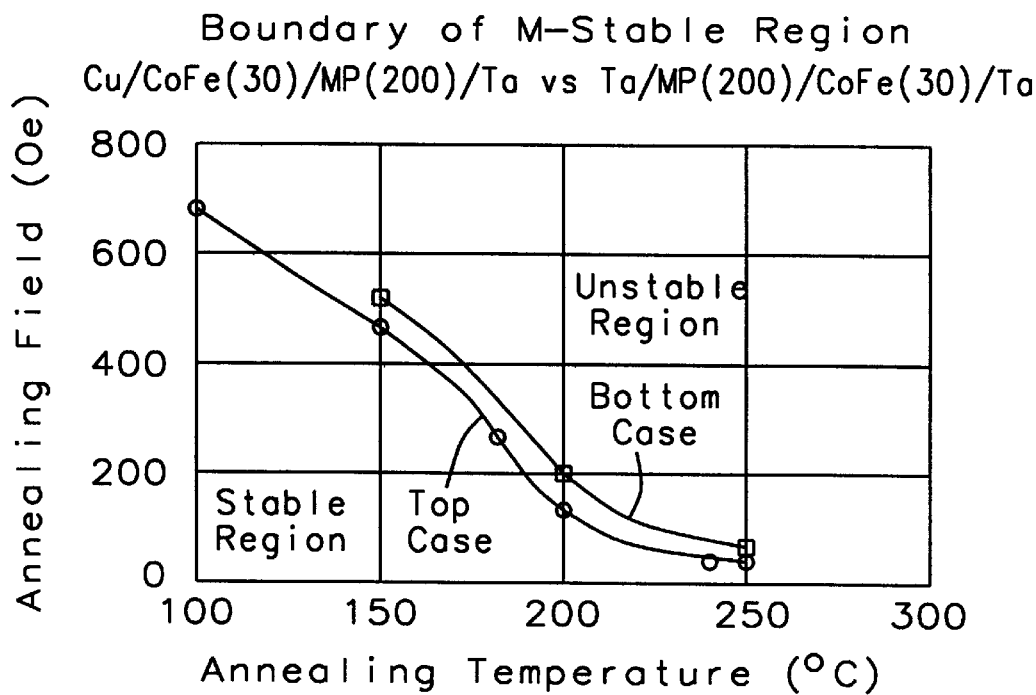
FIG. 3 is a chart of the Boundary of the M-Stable Region which shows the dependence of the thermal stability of the top SVMR and the bottom SVMR B on the second perpendicular annealing magnetic field and the annealing temperature.

FIG. 3 is a chart of the Boundary of the M-Stable Region showing the dependence of the thermal stability of FM/AFM (for the top SVMR T) (Cu/CoFe(30)/MnPt(200)/Ta and AFM/FM (for the bottom SVMR B) vs. Ta/MnPt(200)/CoFe (30)/Ta) on the second perpendicular annealing magnetic field ($H_{ann2}$) and the annealing temperature. The two samples were originally annealed at a high temperature and a high magnetic field (e.g. 280° C.×5 hours×2,000 Oe.) The boundary is defined in such a way that the pinning direction of the sample rotates within 5 degrees with respect to the first annealing direction after annealing for twelve (12) hours at a given set of values for the annealing field and the temperature.

Figure 4:
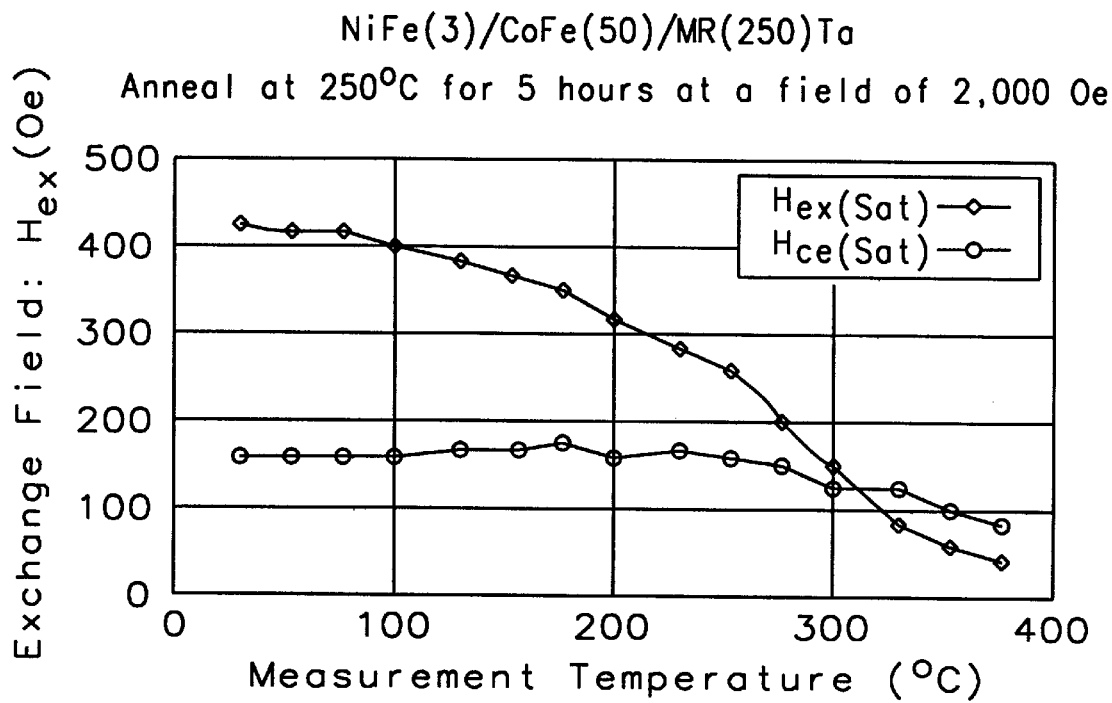
FIG. 4 shows the exchange magnetic field $H_{ex}$ vs. measurement temperature for NiFe(30)/CoFe(50)/MnPt(250)/Ta annealed with a large magnetic field, after which the exchange coupling is fully established.

FIG. 4 shows the exchange field $H_{ex}$ vs. measurement temperature for NiFe(30)/CoFe(50)/MnPt(250)/Ta annealed at 250° C. for 5 hours with a large magnetic field of 2,000 Oe, after which the exchange coupling is fully established.

Figure 5:
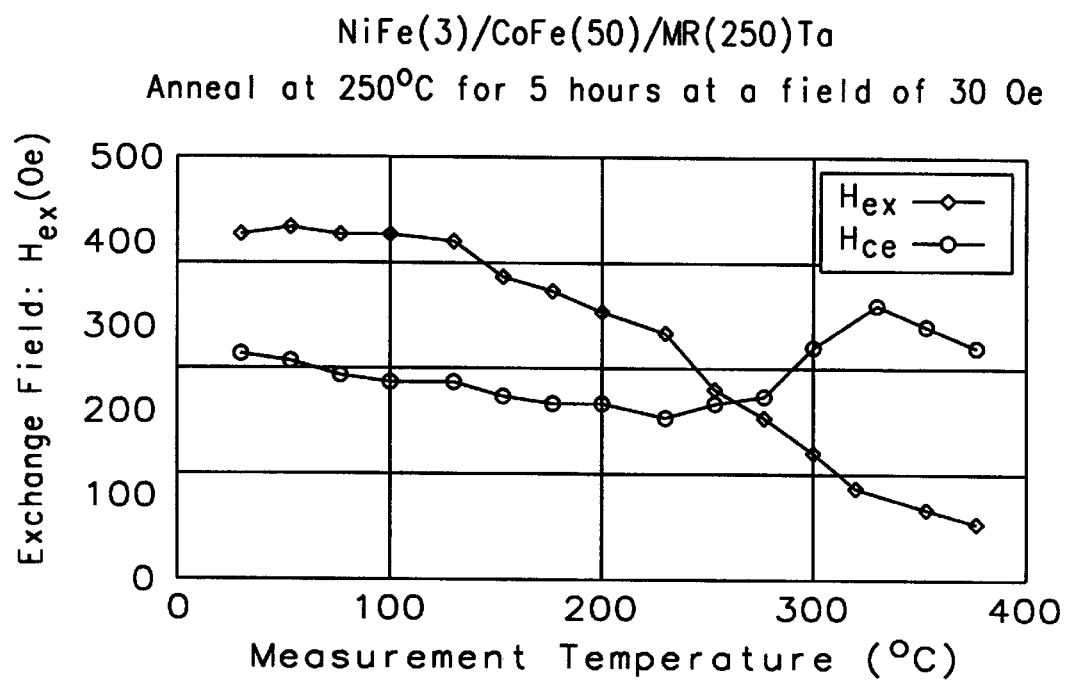
FIG. 5 shows a graph of the magnetic field $H_{ex}$ vs. temperature for NiFe(30)/CoFe(50)/MP(250)/Ta after the second AFM annealed in the presence of a low magnetic field under which the adjacent first AFM is not affected.

FIG. 5 shows a graph of the magnetic field $H_{ex}$ vs. temperature for NiFe(30)/CoFe(50)/MP(250)/Ta after the second AFM is annealed at 250° C. for five (5) hours (for AFMB in SVMB) in the presence of a low magnetic field (30 Oe), under which the adjacent first (already formed AFMA) AFM is not affected.

Figure 6:
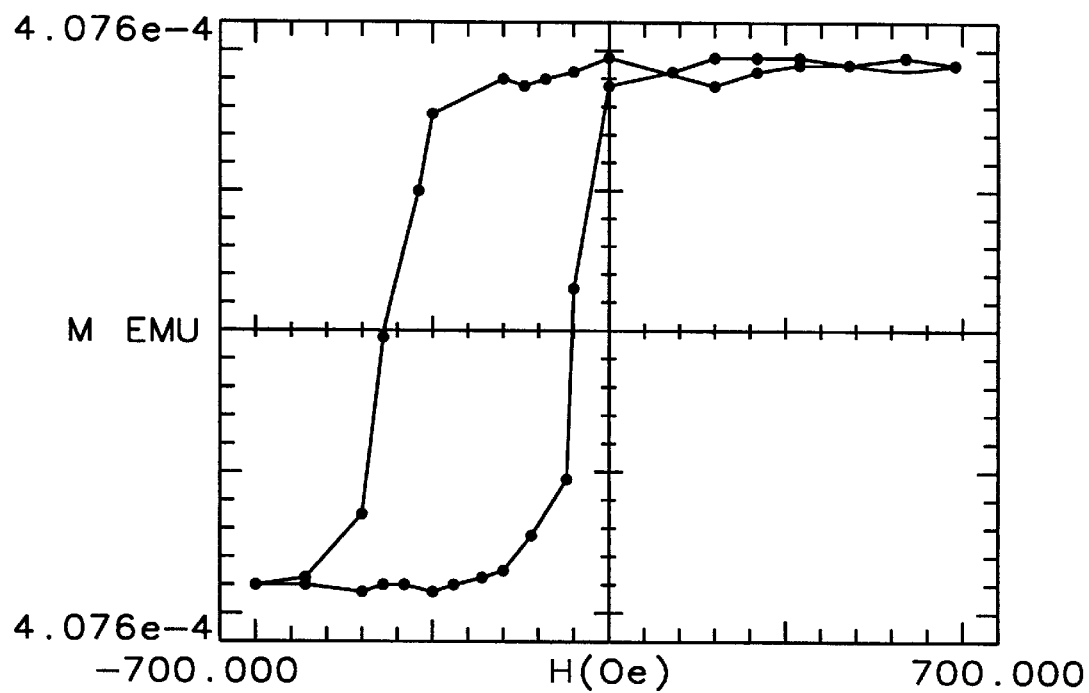
FIG. 6 shows the M-H loops for NiFe(110)/NiMn(300)/Ta, annealed at 300° C. for 5 hours at 2,000 Oe.

FIGS. 6–10 show five different M-H (Magnetization-Magnetic Field) loops for NiFe/NiMn with FIG. 6 showing the M-H loops for NiFe(110)/NiMn(300)/Ta, annealed at 300° C. for 5 hours at 2,000 Oe.

Figure 7:
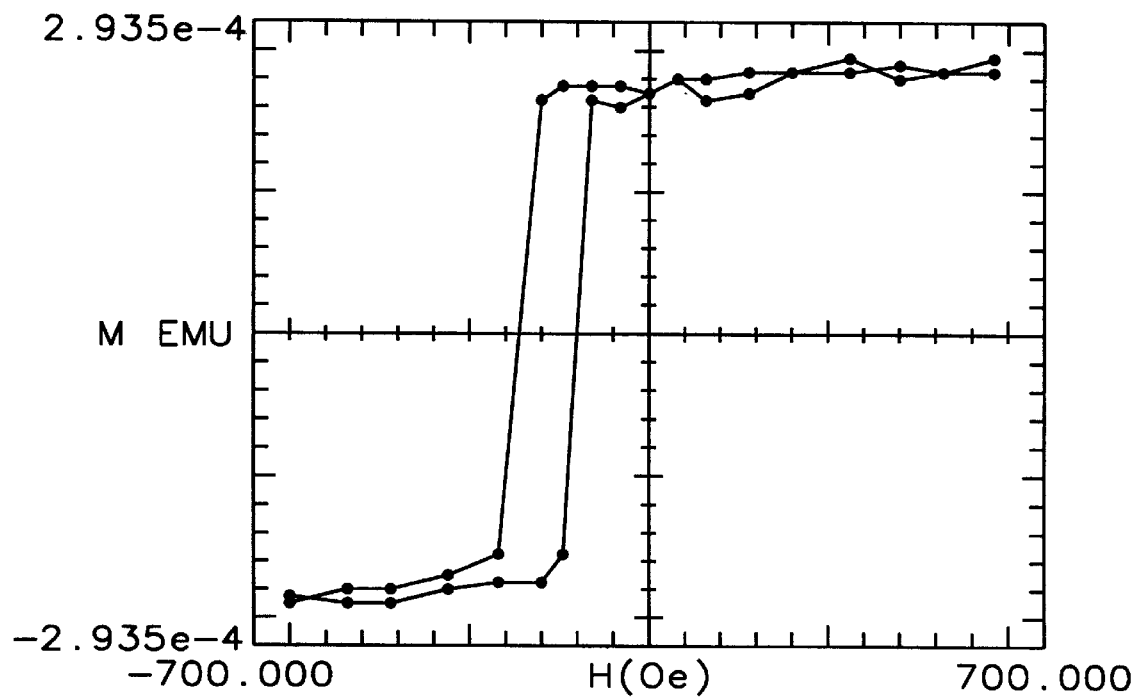
FIG. 7 shows the M-H loops for a NiFe(110)/NiMn(300)/Ta sample annealed at 260° C. for 1 hour at a low external magnetic field of 260 Oe.

FIG. 7 shows the M-H loops for a NiFe(110)/NiMn(300)/Ta sample annealed at 260° C. for 1 hour at a low external field of 260 Oe.

Figure 8:
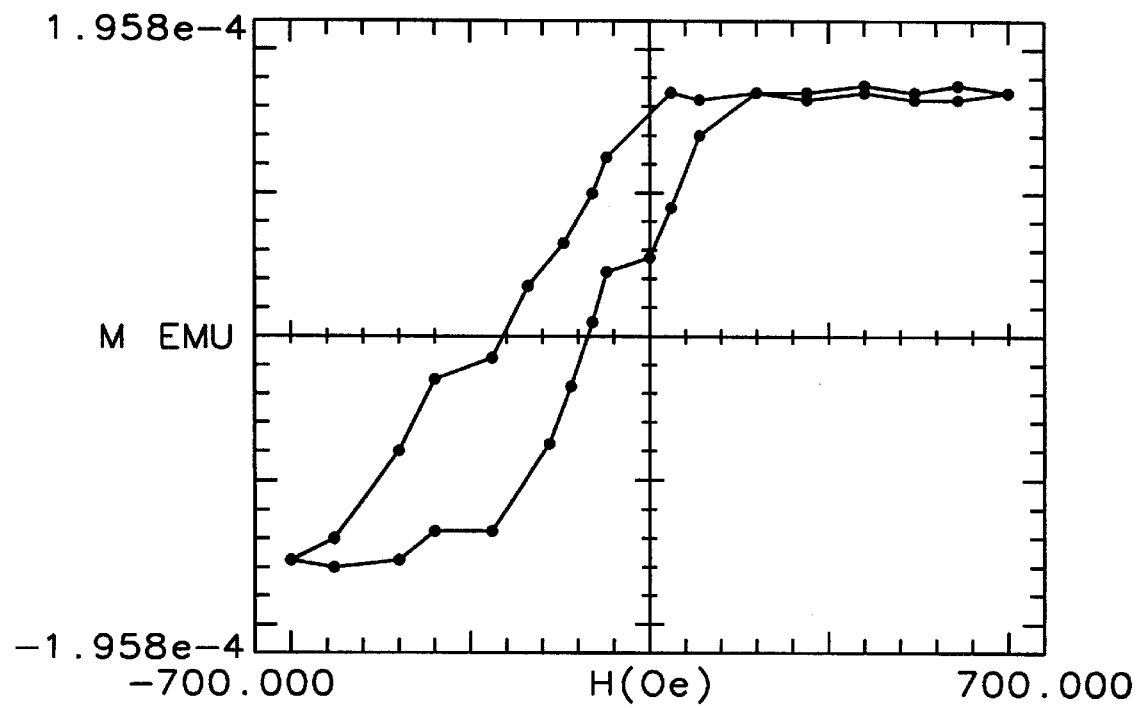
FIG. 8 shows M-H loops for the sample NiFe(110)/NiMn(300)/Ta first annealed with the conditions shown in FIG. 6 and then re-annealed at a low external magnetic field with an opposing annealing direction.

FIG. 8 shows M-H loops for the sample NiFe(110)/NiMn (300)/Ta first annealed with the conditions shown in FIG. 6 and then re-annealed at 260° C. for 1 hour at a low external field of 260 Oe with an opposing annealing direction.

Figure 9:
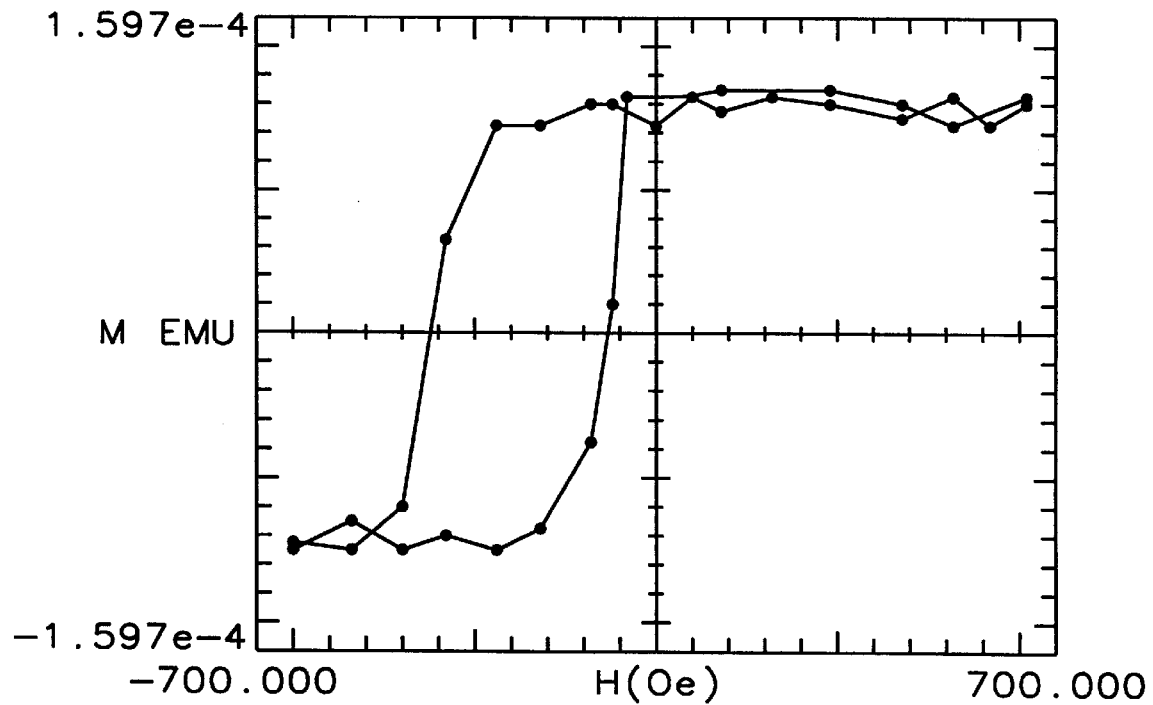
FIG. 9 shows the M-H loops for a NiFe(110)/NiMn(300)/Ta sample after the annealings with the conditions shown in FIGS. 6 and 8 and then after re-annealing again with no external magnetic field.

FIG. 9 shows the M-H loops for a NiFe(110)/NiMn(300)/Ta sample after the annealings with the conditions shown in FIGS. 6 and 8 and then after re-annealing again at 280° C. for 3 hours with no external field. The decreased $H_{ex}$ (See FIG. 8) is repaired.

Figure 10:
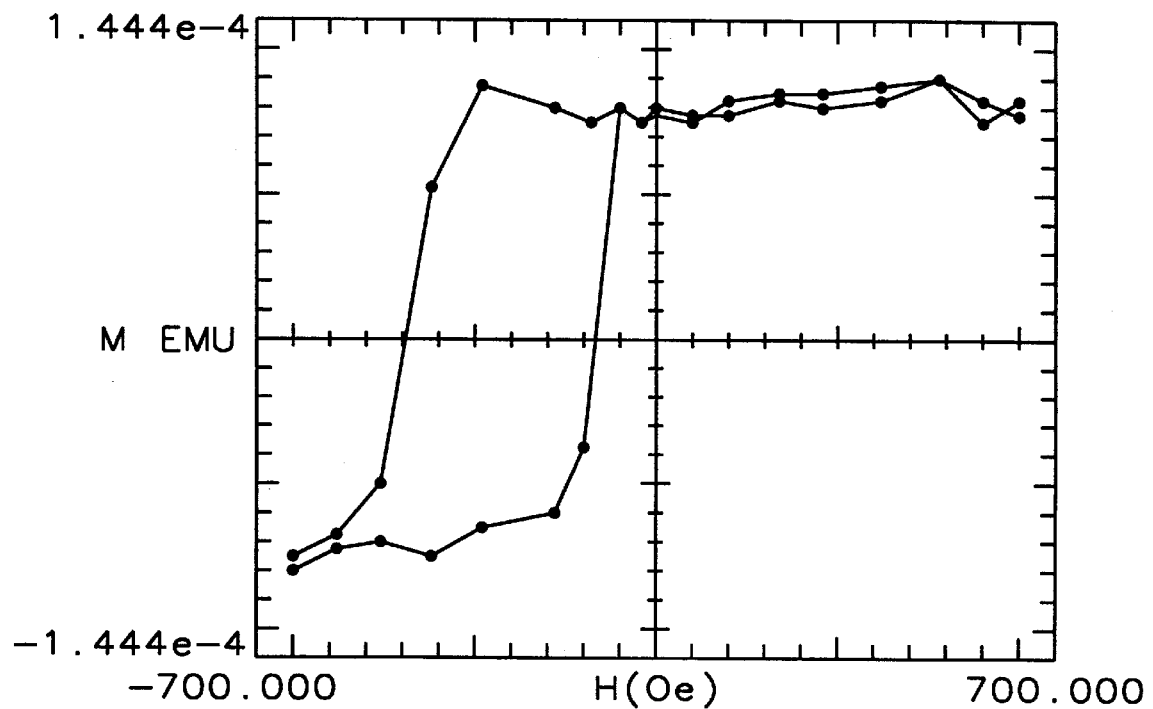
FIG. 10 shows M-H loops for the sample NiFe(110)/NiMn(300)/Ta after annealing as shown in FIG. 7 and then re-annealing with no external magnetic field.

FIG. 10 shows M-H loops for the sample NiFe(110)/NiMn(300)/Ta after the annealing shown in FIG. 7 and then re-annealing at 280° C. for 3 hours with no external field. It can be seen that the strength of the exchange field $H_{ex}$ (See FIG. 8) has been further enhanced.

SUMMARY (1) The process results in no externally applied and thermal disturbances to the AFM element formed initially.

(2) It is easy to reset the pinning directions of the first AFM element and the second AFM element.

(3) In this method, the key is to select a low annealing magnetic field $H_{ann}$ and a moderate annealing temperature T and an appropriate annealing time ($t_{ann}$) in which the AFM phase of the second material can be formed while the (adjacent) first AFM pinning layer remains stable, i.e., (H, T, $t_{ann}$) <(H,T, $t_{ann})_c$.

(4) Finally, to increase the stability and the $H_{ex}$ (Exchange Field H) of both the first AFM and the second AFM, a third no externally applied field ($H_{ann}$=0) annealing step is performed at a high temperature.

(5) A high blocking temperature first AFM material is preferred.

(6) For DSMR and SVMR recording head applications, a second AFM element is needed to pin the second MR layer in a preferred direction (DSMR) or the free (sensing) layer along longitudinal direction if an (SVMR) exchange-coupling scheme is used. The formation conditions for the second AFM element should be chosen in so that no degradation (decrease of exchange magnetic field or rotation of easy axis) occurs in the already formed first AFM element. The first and second AFM materials can either be the same (e.g. MnPt/MnPt, MnPdPt/MnPdPt, or NiMn/NiMn) or different (e.g. MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn . . . ).

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly, all such changes come within the purview of the present invention and the invention encompasses the subject matter of the claims which follow.

Having thus described the invention, what is claimed as new and desirable to be secured by Letters Patent is as follows, we claim:

1. A method of manufacturing a magnetoresistive head comprising the steps as follows:

forming a magnetoresistive (MR) structure with a magnetoresistive element with a first AFM element, performing a first annealing step upon said MR structure at a high temperature with a high magnetic field, completing formation of said MR structure including a second AFM element, performing a low magnetic field ($H_{ann}$) annealing step upon said MR structure following the fabrication of said second AFM element, and performing a no externally applied field ($H_{ann}$=0) annealing step upon said MR structure at a high temperature to increase the $H_{ex}$ of said second AFM element to full strength, whereby the stability of the first AFM element is enhanced or increases its Hex if there were a decrease during the low magnetic field annealing.

2. A method in accordance with claim 1 wherein said first AFM element is composed of a high blocking temperature material.

3. A method in accordance with claim 1 wherein the first and second AFM elements are composed of the same materials selected from the group of ordered AFM materials consisting of MnPt/MnPt, NiMn/NiMn, MnPdPt/MnPdPt.

4. A method in accordance with claim 1 wherein the first and second AFM elements are composed of different materials selected from the groups of layers of ordered/ordered AFM materials or layers of ordered/disordered AFM materials consisting of MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn.

5. A method in accordance with claim 1 wherein:

said first AFM element is composed of a high blocking temperature material, and said first and second AFM elements are composed of the same materials selected from the group of ordered layers of AFM materials consisting of MnPt/MnPt, NiMn/NiMn, MnPdPt/MnPdPt.

6. A method in accordance with claim 1 wherein:

said first AFM element is composed of a high blocking temperature material, and said first and second AFM elements are composed of the same materials selected from the groups of ordered layers of AFM materials consisting of MnPt/MnPt, NiMn/NiMn, MnPdPt/MnPdPt.

7. A method in accordance with claim 1 wherein:

said first AFM element is composed of a high blocking temperature material, and the first and second AFM elements are composed of different materials selected from the groups consisting of MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn.

8. A method of manufacturing a magnetoresistive head in accordance with claim 1 wherein said magnetoresistive (MR) structure includes a pinned layer combined with a first AFM element layer.

9. A method in accordance with claim 8 wherein said pinned layer is a single, soft FerroMagnetic material.

10. A method in accordance with claim 9 wherein said single, soft FerroMagnetic material is selected from the group consisting of NiFe, Co, and CoFe.

11. A method in accordance with claim 9 wherein said single, soft FerroMagnetic material selected from the group consisting of NiFe, Co, and CoFe.

12. A method in accordance with claim 8 wherein said pinned layer is a single, soft FerroMagnetic material and said pinned layer is a single, soft FerroMagnetic material selected from the group consisting of NiFe, Co, and CoFe.

13. A method in accordance with claim 8 wherein said pinned layer is a soft FerroMagnetic material or a combination of layers of soft FerroMagnetic materials.

14. A method in accordance with claim 8 wherein said pinned layer is a composite FerroMagnetic material selected from the group of layers of material consisting of NiFe/ CoFe, NiFe/Co, CoFe/NiFe, Co/NiFe, NiFe/CoNiFe, CoNiFe/NiFe, Co/CoNiFe, CoNiFe/Co, CoFe/Co, and Co/CoFe.

15. A method in accordance with claim 8 wherein:

said pinned layer is a single, soft FerroMagnetic material selected from the group consisting of NiFe, Co, CoFe, and CoNiFe, said first AFM element is composed of a high blocking temperature material, and said first and second AFM elements are composed of the same materials selected from the groups consisting of MnPt/MnPt, NiMn/NiMn, MnPdPt/MnPdPt.

16. A method in accordance with claim 8 wherein:

said pinned layer is a composite FerroMagnetic material selected from the groups consisting of NiFe/CoFe, NiFe/Co, CoFe/NiFe, Co/NiFe, CoNiFe/NiFe, NiFe/ CoNiFe, CoNiFe/NiFe, Co/CoNiFe, CoNiFe/Co, CoFe/Co, and Co/CoFe, said first AFM element is composed of a high blocking temperature material, and said first and second AFM elements are composed of the same materials selected from the groups consisting of MnPt/MnPt, NiMn/NiMn, MnPdPt/MnPdPt.

17. A method in accordance with claim 8 wherein:

said pinned layer is a single, soft FerroMagnetic material selected from the group consisting of NiFe, Co, CoFe, and CoNiFe, said first AFM element is composed of a high blocking temperature material, and said first and second AFM elements are composed of different materials selected from the groups consisting of MnPt/FeMn, MnPdPt/FeMn, NiMn/FeMn, MnPt/ IrMn, MnPdPt/IrMn, NiMn/IrMn, MnPt/NiO, MnPt/ FeMn, MnPdPt/FeMn, and NiMn/FeMn.

18. A method in accordance with claim 8 wherein:

said pinned layer is a composite FerroMagnetic material selected from the groups consisting of NiFe/CoFe, NiFe/Co, CoFe/NiFe, and Co/NiFe said first AFM element is composed of a high blocking temperature material, and said first and second AFM elements are composed of different materials selected from the groups consisting of MnPt/FeMn, MnPdPt/FeMn, NiMn/FeMn, MnPt/ IrMn, MnPdPt/IrMn, NiMn/IrMn, MnPt/NiO, MnPt/ FeMn, MnPdPt/FeMn, and NiMn/FeMn.

19. A method of manufacturing a magnetoresistive (MR) head comprising the steps as follows:

forming a first MR structure of said MR head with a free layer, a conductor layer, a pinned layer, and a first AFM element on said pinned layer formed in that sequence, performing a first annealing step at a high temperature with a high magnetic field upon said first MR structure, completing formation of said MR head including second AFM elements, performing a low magnetic field ($H_{ann}$) annealing step upon said MR head following fabrication of said second AFM elements, and performing a no externally applied field ($H_{ann}=0$) annealing step at a high temperature to increase the $H_{ex}$ of said second AFM element to full strength, whereby the stability of said first AFM is enhanced or increases its $H_{ex}$ if there were a decrease during said low magnetic field annealing.

20. A method in accordance with claim 19 wherein said pinned layer is a single, soft FerroMagnetic material.

21. A method in accordance with claim 19 wherein said pinned layer is a single, soft FerroMagnetic material selected from the group consisting of NiFe, Co, and CoFe.

22. A method in accordance with claim 19 wherein said pinned layer is a soft FerroMagnetic material or a combination of layers of soft FerroMagnetic materials.

23. A method in accordance with claim 19 wherein said pinned layer is a composite FerroMagnetic material selected from the group of layers of material consisting of NiFe/ CoFe, NiFe/Co, CoFe/NiFe, Co/NiFe, NiFe/CoNiFe, CoNiFe/NiFe, Co/CoNiFe, CoNiFe/Co, CoFe/Co, and Co/CoFe.

24. A method in accordance with claim 19 wherein:

said pinned layer is a single, soft FerroMagnetic material selected from the group consisting of NiFe, Co, CoFe, and CoNiFe, said first AFM element is composed of a high blocking temperature material, and said first and second AFM elements are composed of the same materials selected from the groups consisting of MnPt/MnPt, NiMn/NiMn, MnPdPt/MnPdPt.

25. A method in accordance with claim 19 wherein:

said pinned layer is a composite FerroMagnetic material selected from the groups consisting of NiFe/CoFe, NiFe/Co, CoFe/NiFe, Co/NiFe, CoNiFe/NiFe, NiFe/ CoNiFe, CoNiFe/NiFe, Co/CoNiFe, CoNiFe/Co, CoFe/Co, and Co/CoFe, said first AFM element is composed of a high blocking temperature material, and said first and second AFM elements are composed of the same materials selected from the groups consisting of MnPt/MnPt, NiMn/NiMn, MnPdPt/MnPdPt.

26. A method in accordance with claim 19 wherein:

said pinned layer is a single, soft FerroMagnetic material selected from the group consisting of NiFe, Co, CoFe, and CoNiFe, said first AFM element is composed of a high blocking temperature material, and said first and second AFM elements are composed of different materials selected from the groups consisting of MnPt/FeMn, MnPdPt/FeMn, NiMn/FeMn, MnPt/ IrMn, MnPdPt/IrMn, NiMn/IrMn, MnPt/NiO, MnPt/ FeMn, MnPdPt/FeMn, and NiMn/FeMn.

27. A method in accordance with claim 19 wherein:

said pinned layer is a composite FerroMagnetic material selected from the groups consisting of NiFe/CoFe, NiFe/Co, CoFe/NiFe, and Co/NiFe said first AFM element is composed of a high blocking temperature material, and said first and second AFM elements are composed of different materials selected from the groups consisting of MnPt/FeMn, MnPdPt/FeMn, NiMn/FeMn, MnPt/ IrMn, MnPdPt/IrMn, NiMn/IrMn, MnPt/NiO, MnPt/ FeMn, MnPdPt/FeMn, and NiMn/FeMn.

28. A method of manufacturing a magnetoresistive head comprising the steps as follows:

forming a magnetoresistive (MR) structure with a first magnetoresistive stripe having first ends and first AFM elements formed on said first ends of said first magnetoresistive stripe, performing a first annealing step upon said MR structure at a high temperature with a high magnetic field, forming an insulating layer over said first first magnetoresistive stripe and said first AFM elements, completing formation of said MR structure including formation of a second magnetoresistive stripe having second ends with second AFM elements formed on the said second ends of said second magnetoresistive stripe, performing a low magnetic field ($H_{ann}$) annealing step upon said MR structure following fabrication of said second AFM elements, and performing a no externally applied field ($H_{ann}=0$) annealing step upon said MR structure at a high temperature to increase the $H_{ex}$ of said second AFM element to full strength, whereby the stability of said first AFM is enhanced or increases its $H_{ex}$ if there were a decrease during said low magnetic field annealing.

29. A method in accordance with claim 28 wherein said first AFM element is composed of a high blocking temperature material.

30. A method in accordance with claim 28 wherein the first and second AFM elements are composed of the same materials selected from the group of ordered AFM materials consisting of MnPt/MnPt, NiMn/NiMn, MnPdPt/MnPdPt.

31. A method in accordance with claim 28 wherein the first and second AFM elements are composed of different materials selected from the groups of layers of ordered/ordered AFM materials or layers of ordered/disordered AFM materials selected from the groups consisting of MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn.

32. A method in accordance with claim 28 wherein:

said first AFM element is composed of a high blocking temperature material, and said first and second AFM elements are composed of the same materials selected from the group of ordered layers of AFM materials consisting of MnPt/MnPt, NiMn/NiMn, MnPdPt /MnPdPt.

33. A method in accordance with claim 28 wherein:

said first AFM element is composed of a high blocking temperature material, and said first and second AFM elements are composed of the same materials selected from the groups of ordered layers of AFM materials consisting of MnPt/MnPt, NiMn/NiMn, MnPdPt/MnPdPt.

34. A method in accordance with claim 28 wherein:

said first AFM element is composed of a high blocking temperature material, and the first and second AFM elements are composed of different materials selected from the groups consisting of MnPt/FeMn, MnPdPt/FeMn, NiMn/FeMn, MnPt/IrMn, MnPdPt/IrMn, NiMn/IrMn, MnPt/NiO, MnPt/FeMn, MnPdPt/FeMn, and NiMn/FeMn.

* * * * *